US012603360B2

(12) United States Patent
Jeong et al.

(10) Patent No.: US 12,603,360 B2
(45) Date of Patent: Apr. 14, 2026

(54) BATTERY MODULE

(71) Applicant: SK ON CO., LTD., Seoul (KR)

(72) Inventors: Won Seok Jeong, Daejeon (KR); Hae Ryong Jeon, Daejeon (KR); Seung Dong Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 553 days.

(21) Appl. No.: 18/182,367

(22) Filed: Mar. 13, 2023

(65) Prior Publication Data

US 2024/0106031 A1 Mar. 28, 2024

(30) Foreign Application Priority Data

Sep. 26, 2022 (KR) ........................ 10-2022-0121785

(51) Int. Cl.
| | |
|---|---|
| *H01M 10/658* | (2014.01) |
| *H01M 50/211* | (2021.01) |
| *H01M 50/289* | (2021.01) |
| *H01M 50/367* | (2021.01) |

(52) U.S. Cl.
CPC ....... *H01M 10/658* (2015.04); *H01M 50/211* (2021.01); *H01M 50/289* (2021.01); *H01M 50/367* (2021.01)

(58) Field of Classification Search
CPC .......................... H01M 50/289; H01M 50/367
See application file for complete search history.

(56) References Cited

U.S. PATENT DOCUMENTS

| | | | |
|---|---|---|---|
| 2013/0040174 A1 | 2/2013 | Takasaki et al. | |
| 2021/0143508 A1* | 5/2021 | Yoshida .............. | H01M 50/291 |
| 2022/0123423 A1* | 4/2022 | Wang .................. | H01M 50/249 |
| 2023/0198077 A1* | 6/2023 | Kim .................... | H01M 50/383 |
| | | | 429/156 |
| 2024/0154229 A1* | 5/2024 | Kim .................. | H01M 10/6556 |

FOREIGN PATENT DOCUMENTS

| | | |
|---|---|---|
| EP | 3926747 A1 | 12/2021 |
| EP | 4019094 A1 | 6/2022 |
| KR | 10-2270234 B1 | 6/2021 |
| KR | 10-2022-0014027 A | 2/2022 |

OTHER PUBLICATIONS

Extended European Search Report for the European Patent Application No. 23161959.4 issued by the European Patent Office on Oct. 9, 2023.

* cited by examiner

*Primary Examiner* — Brian R Ohara
*Assistant Examiner* — M. T. Leonard
(74) *Attorney, Agent, or Firm* — IP & T GROUP LLP

(57) ABSTRACT

A battery module of the present disclosure includes a plurality of cell stacks spaced apart from each other in a horizontal direction, a plurality of side walls disposed between the plurality of cell stacks and spaced apart from each other in the horizontal direction, and a plate accommodated in a hollow between the plurality of side walls. Each of the plurality of side walls includes a side hole connected to the hollow.

19 Claims, 10 Drawing Sheets

BATTERY MODULE

CROSS-REFERENCE TO RELATED APPLICATION

The present application claims priority under 35 U.S.C. § 119(a) to Korean patent application number 10-2022-0121785 filed on Sep. 26, 2022, in the Korean Intellectual Property Office, the entire disclosure of which is incorporated by reference herein.

BACKGROUND

1. Technical Field

The present disclosure relates to a secondary battery, and specifically, to a battery module and a manufacturing method thereof.

2. Related Art

As an energy source that drives various electronic devices such as smartphones, laptops, vehicles, and drones, the demand for secondary batteries is rapidly increasing.

In particular, as a secondary battery for driving vehicles, research on battery modules to increase energy density is actively underway.

The battery module may include a plurality of cell stacks in which multiple battery cells are stacked. The battery cell may represent the smallest unit of the battery.

Meanwhile, for the battery module, there is a problem in that the structure of the battery module is deformed or destroyed due to an increase in internal pressure due to gas generated from a specific battery cell. In addition, there is a problem in that high-temperature gas and heat generated in a specific battery cell are propagated to other battery cells to accelerate fire or thermal propagation. Accordingly, a method of increasing the stability of the battery module is being sought.

SUMMARY

Embodiments provide a battery module in which the stability of battery cells is improved.

In accordance with an aspect of the present disclosure, there is provided a battery module including a plurality of cell stacks spaced apart from each other in a horizontal direction, a plurality of side walls disposed between the plurality of cell stacks and spaced apart from each other in the horizontal direction, and a plate accommodated in a hollow between the plurality of side walls, Each of the plurality of side walls includes a side hole connected to the hollow.

In an embodiment, the plate may be moved to shield a side hole of a second side wall of the plurality of side walls by gas inflowing into the hollow through a side hole of a first side wall of the plurality of side walls.

In an embodiment, an upper part of the hollow may be connected to an external space, and the inflowing gas may be discharged to the external space through the upper part of the hollow.

In an embodiment, a length between the first side wall and the plate may become greater than a length between the second side wall and the plate when the gas inflows into the side hole of the first side wall.

In an embodiment, each of the plurality of cell stacks may include a plurality of battery cells stacked in a vertical direction.

In an embodiment, each of the plurality of side walls may include a plurality of sub-areas disposed in the vertical direction, and each of the plurality of sub-areas may contact with one of the plurality of battery cells.

In an embodiment, the side hole may be disposed in each of the plurality of sub-areas.

In an embodiment, the battery module may further include a plurality of connecting parts configured to connect between the plurality of side walls to form the hollow.

In an embodiment, a cross section in a vertical direction of each of the plurality of connecting parts may be concave.

In an embodiment, a first side end of the plate may be coupled to an inside of a first side wall of the plurality of side walls, and a second side end of the plate is coupled to an inside of a second side wall of the plurality of side walls.

In an embodiment, the first side end of the plate may be separated from the inside of the first side wall by gas inflowing into the hollow through a side hole of the first side wall and then moved to the inside of the second side wall. A side hole of the second side wall may be shielded by the plate.

In an embodiment, the plate may include an insulating material.

In accordance with another aspect of the present disclosure, there is provided a battery module including a first cell stack and a second cell stack spaced apart from each other in a first horizontal direction, a partition wall including a first side wall and a second side wall disposed between the first cell stack and the second cell stack, and a plurality of hollows disposed between the first side wall and the second side wall, and a plurality of plates, each of the plurality of plates being accommodated in each of the plurality of hollows. Each of the first side wall and the second side wall includes a plurality of side holes.

In an embodiment, each of the plurality of side holes may be connected to any one hollow of the plurality of hollows.

In an embodiment, the plurality of hollows may include a first hollow connected to a first side hole of the first side wall and a second side hole of the second side wall among the plurality of side holes, and a second hollow connected to a third side hole of the first side wall and a fourth side hole of the second side wall among the plurality of side holes.

In an embodiment, the plurality of plates may include a first plate accommodated in the first hollow and a second plate accommodated in the second hollow.

In an embodiment, the first plate may be moved to shield the second side hole when gas inflows into the first hollow through the first side hole.

In an embodiment, the gas may be discharged to an external space through the first hollow.

In an embodiment, the partition wall may further include a plurality of connecting parts spaced apart from each other in a second horizontal direction between the first side wall and the second side wall to form the plurality of hollows.

In an embodiment, each of the first cell stack and the second cell stack may include a plurality of battery cells stacked in a vertical direction. The plurality of side holes may be disposed on each of the first side wall and the second side wall according to a row corresponding to the vertical direction and a column corresponding to the second horizontal direction. Each of the plurality of plates may have a size covering side holes located in the same column among the plurality of side holes.

An embodiment of the present disclosure may provide a battery module in which the stability of battery cells is improved.

An embodiment of the present disclosure may discharge a gas generated from a battery cell to an external space.

An embodiment of the present disclosure may reduce the transfer of high temperature gas or heat generated in a battery cell to another battery cell.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the present disclosure, and the embodiments according to the concept of the present disclosure can be implemented in various forms, and cannot be construed as limited to the embodiments set forth herein.

Figure 1:
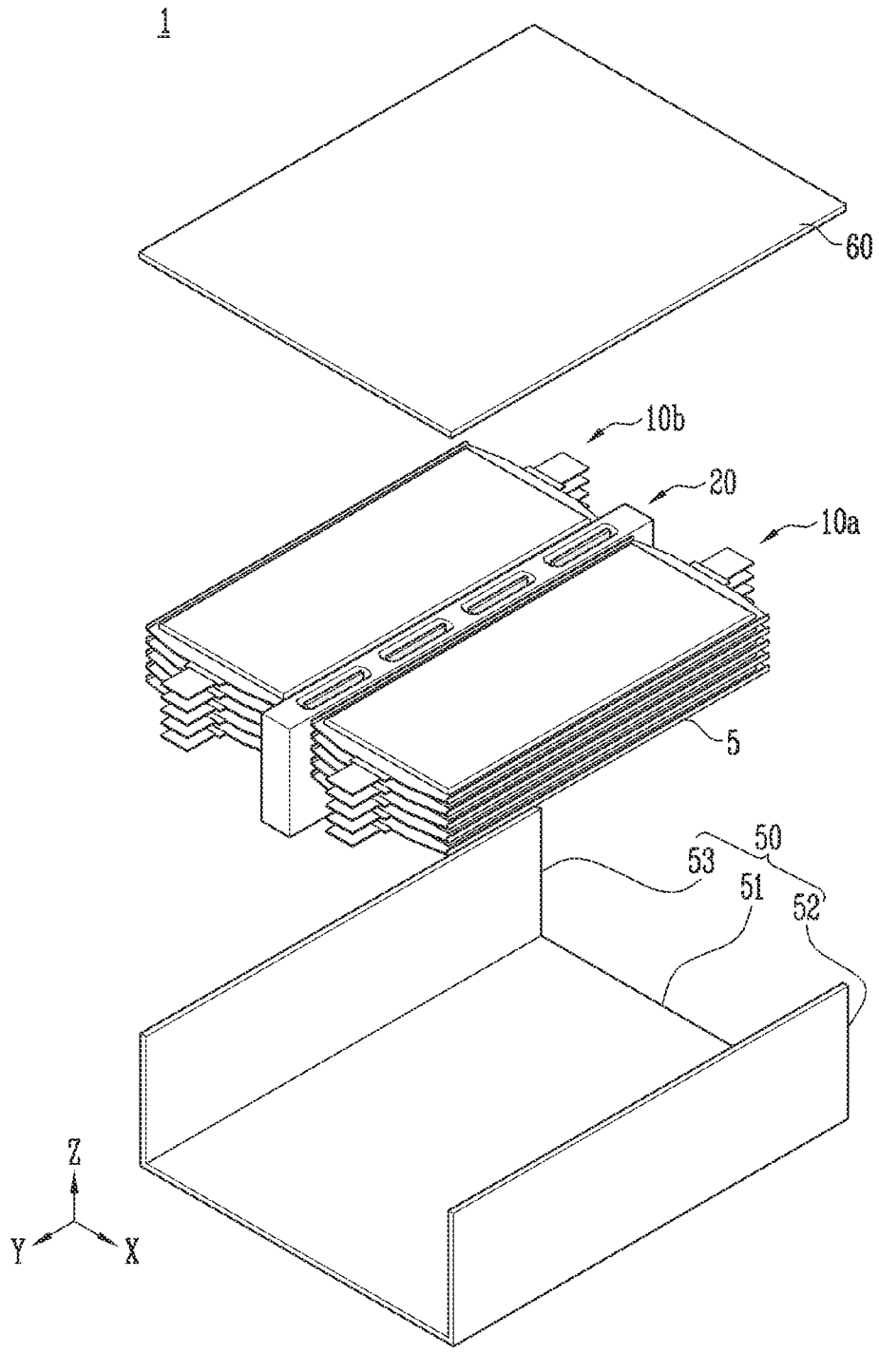
FIG. 1 is a diagram for illustrating a battery module in accordance with an embodiment.

FIG. 1 is a diagram for illustrating a battery module in accordance with an embodiment.

Referring to FIG. 1, a battery module 1 may include a plurality of cell stacks 10a, 10b and a partition wall 20.

Each of the plurality of cell stacks 10a and 10b may include a plurality of battery cells 5.

The plurality of battery cells 5 may be stacked in a vertical direction. For example, the vertical direction may be in the Z axis direction. The plurality of battery cells 5 may be electrically connected to each other. For example, the battery cell 5 may be a lithium ion battery, but this is only an example and may be various types of secondary batteries such as a lithium metal battery, a lithium sulfur battery, a solid-state battery, a lithium air battery, and the like. The battery cell 5 may be a pouch-type battery, but this is only an example and may be transformed into various types of batteries such as prismatic and cylindrical.

The plurality of cell stacks 10a, 10b may be spaced apart in a first horizontal direction. For example, the first horizontal direction may be in the X-axis direction. The first horizontal direction may be a direction perpendicular to the vertical direction.

The partition wall 20 may be disposed between the plurality of cell stacks 10a, 10b. The partition wall 20 may fix or support the plurality of cell stacks 10a, 10b.

In an embodiment, the battery module 1 may further include a module case. For example, the module case may be a metal such as aluminum or iron, or an alloy of metal. However, this is only an example, and the material of the module case may be modified into various materials including thermosetting resins. For a specific example, the material of the module case may be a single material composed of a thermosetting resin or a composite material further including other materials having special properties of the thermosetting resin. Here, the special properties may be flame retardant, heat resistance, and the like. Other materials may be, for example, carbon fiber, glass fiber, and the like.

The module case may include a lower case 50 and an upper case 60. The lower case 50 may include a lower cover 51 and side covers 52, 53. The lower cover 51 and the side covers 52, 53 may be integrally manufactured or individually manufactured and coupled using a method such as bolting or welding.

The lower cover 51 may support the lower part of the plurality of cell stacks 10a, 10b.

The side covers 52, 53 may support the sides of the plurality of cell stacks 10a, 10b. The side covers 52, 53 may be disposed to be spaced apart from each other and coupled to the lower cover 51. For example, the side covers 52, 53 may be spaced apart in the first horizontal direction. Here, the first horizontal direction may be in the X-axis direction. Meanwhile, unlike that shown in FIG. 1, the side covers 52, 53 may be spaced apart in the second horizontal direction. Here, the second horizontal direction may be in the Y-axis direction perpendicular to the X-axis direction. In another embodiment, the lower case 50 may include a lower cover 51, side covers 52, 53 spaced apart in the first horizontal direction, and side covers spaced apart in the second horizontal direction. Hereinafter, description will be made on the assumption that the first horizontal direction is the X-axis direction, the second horizontal direction is the Y-axis direction, and the vertical direction is the Z-axis direction.

The upper case 60 may be disposed on the upper part of the plurality of cell stacks 10a and 10b.

The battery module 1 may include a plate accommodated inside the partition wall 20.

The battery module 1 according to an embodiment of the present disclosure may effectively discharge high-temperature gas generated from a specific battery cell to an external space through the partition wall 20 disposed between the plurality of cell stacks 10a, 10b and a plate accommodated inside the partition wall 20. In addition, the battery module 1 may minimize the transfer of high temperature gas or heat generated in a particular battery cell to another adjacent battery cell. Hereinafter, the present disclosure will be described in more detail with reference to the accompanying drawings.

Figure 2:
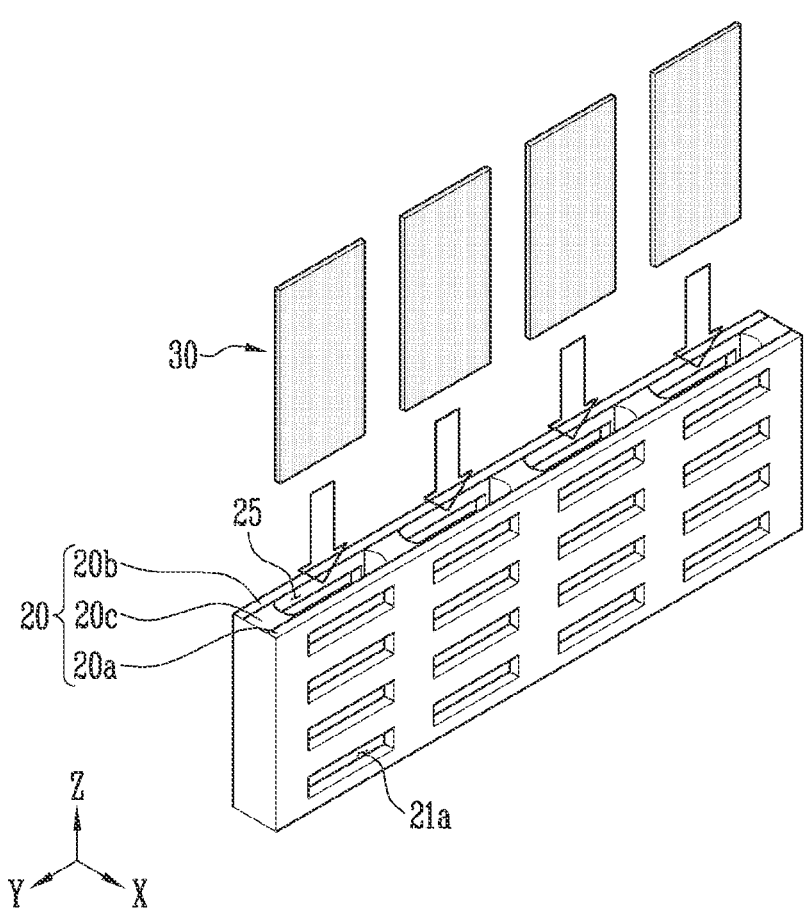
FIG. 2 is a diagram for illustrating a partition wall and a plate in accordance with an embodiment.

FIG. 2 is a diagram for illustrating a partition wall and a plate in accordance with an embodiment.

Referring to FIG. 2, the partition wall 20 may include a side hole 21a. The side hole 21a may be formed on the side of the partition wall 20. The side hole 21a may be a hole penetrated in the first horizontal direction. The side hole 21a may be a passage through which gas generated from the battery cell inflows.

The partition wall 20 may include a hollow 25. The hollow 25 may be formed inside the partition wall 20. The hollow 25 may be a hole penetrated in a vertical direction. The hollow 25 may be connected to the side hole 21a. Gas may inflow into the hollow 25 through the side hole 21a. The plate 30 may be inserted and accommodated in the hollow 25. The upper part of the hollow 25 may be connected to the external space. In other words, the hollow 25 may be a structure with an open upper part. The gas inflowing into the hollow 25 may be discharged to the external space through the upper part of the hollow 25.

In an embodiment, the partition wall 20 may include a plurality of side walls 20a, 20b. The plurality of side walls 20a, 20b may be disposed between the plurality of cell stacks. The plurality of cell stacks may be spaced apart from each other in the first horizontal direction. The plurality of side walls 20a, 20b may be spaced apart from each other in the first horizontal direction. For example, the plurality of side walls 20a, 20b may include a first side wall 20a and a second side wall 20b.

Each of the plurality of side walls 20a, 20b may include a side hole 21a. The hollow 25 may be formed between the plurality of side walls 20a, 20b. The side hole 21a may be connected to the hollow 25.

In an embodiment, the partition wall 20 may further include a plurality of connecting parts 20c. The plurality of connecting parts 20c may be spaced apart from each other in the second horizontal direction. The connecting part 20c may connect between the plurality of side walls 20a, 20b. Here, the hollow 25 may be formed between the plurality of side walls 20a, 20b and the plurality of connecting parts 20c.

In an embodiment, the hollow 25 included in the partition wall 20 of the present disclosure may be one or plurality. In an embodiment, when there are a plurality of hollows 25, the plurality of hollows 25 may be spaced apart in the second horizontal direction.

The plate 30 may be accommodated in the hollow 25. The plate 30 may be moved by the gas inflowing into the hollow 25 through the side hole 21a. The plate 30 may be moved to shield the side hole 21a through which the gas inflows and the opposite side hole.

Meanwhile, the plate 30 may be manufactured in a state accommodated in the partition wall 20 or may be manufactured separately from the partition wall 20 and then accommodated in the partition wall 20.

In an embodiment, the plate 30 may include an insulating material. The insulating material may be a material having thermal insulation properties due to its low thermal conductivity. For example, the insulating material may include at least one material such as mica, silicate, glass fiber, mineral fiber, and the like.

In an embodiment, the material of the partition wall 20 may be aluminum (e.g., Al50 series, Al60 series, etc.), stainless steel (e.g., SUS 303, SUS304, etc.), or a metal composite material including one or more insulating materials such as mica. In an embodiment, the material of the partition wall 20 may be a composite resin material including glass fiber or carbon fiber. However, this is only an embodiment, and the material of the partition wall 20 may be modified and implemented with various materials.

Figure 3A:
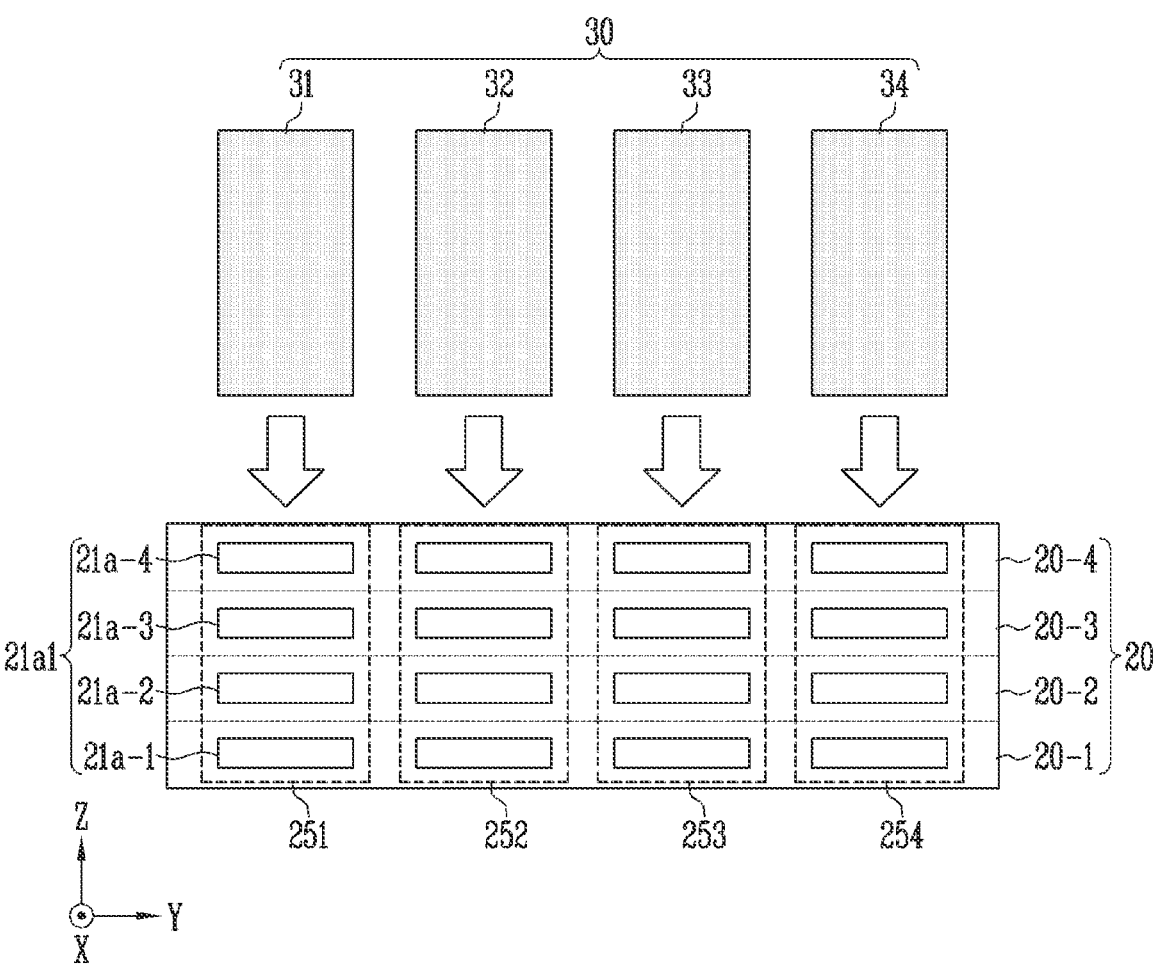
FIGS. 3A and 3B are diagrams for illustrating a partition wall and a plate in detail in accordance with an embodiment.
Figure 3B:
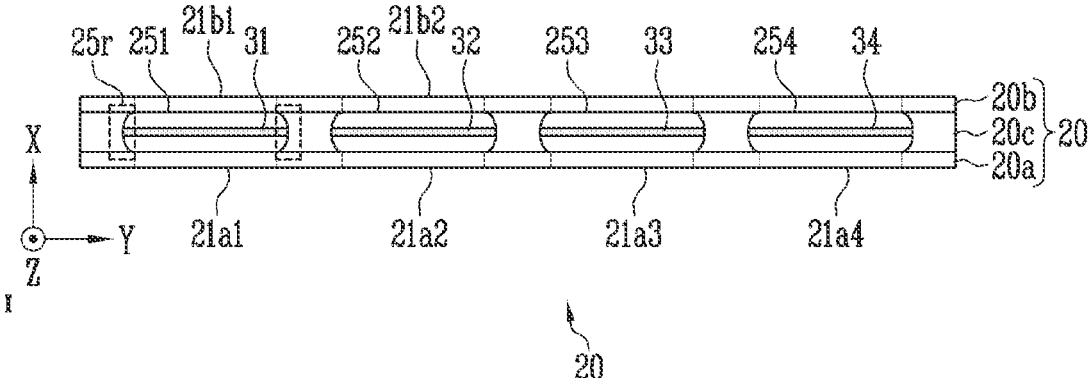

FIGS. 3A and 3B are diagrams for illustrating a partition wall and a plate in detail in accordance with an embodiment. FIG. 3A is a side view of the partition wall, and FIG. 3B is a plan view of the partition wall.

Referring to FIGS. 3A and 3B, a plurality of plates 30 may be inserted and accommodated inside the partition wall 20.

In an embodiment, the partition wall 20 may include a plurality of side walls 20a, 20b and a plurality of connecting parts 20c. The plurality of side walls 20a, 20b may include a first side wall 20a and a second side wall 20b. The plurality of connecting parts 20c may be spaced apart in the second horizontal direction. For example, the number of connecting parts 20c may be five. In this case, four hollows 251~254 may be formed between the first side wall 20a, the second side wall 20b, and the plurality of connecting parts 20c. In other words, the partition wall 20 may include a first hollow 251 to a fourth hollow 254.

The plurality of hollows 251~254 may be spaced apart in the second horizontal direction. One plate 31~34 may be accommodated in each hollow 251~254. For example, the plurality of hollows 251~254 may include first hollow 251 to fourth hollow 254. In this case, the first plate 31 may be accommodated in the first hollow 251, the second plate 32 may be accommodated in the second hollow 252, the third plate 33 may be accommodated in the third hollow 253, and the fourth plate 34 may be accommodated in the fourth hollow 254.

In an embodiment, each side wall 20a, 20b may be in contact with one cell stack. For example, the first side wall 20a disposed between the first cell stack and the second cell stack may be in contact with the first cell stack. The second side wall 20b disposed between the first cell stack and the second cell stack may be in contact with the second cell stack.

Referring to FIG. 3A, in an embodiment, each of the plurality of side walls 20a, 20b may include a plurality of sub-areas 20-1~20-4 disposed in a vertical direction. One sub-area 20-1~20-4 may be an area in contact with one battery cell in one cell stack. For example, the number of sub-areas 20-1~20-4 may be the same as the number in which battery cells are stacked. In other words, each of the side walls 20a, 20b may contact with the plurality of battery cells.

Each side wall 20a, 20b may include a plurality of side holes 21a1, 21a2, 21b1, 21b2. At least one side hole 21a-1~21a-4 may be disposed in each sub-area 20-1~20-4. In other words, the number of side holes 21a-1~21a-4 disposed in one sub-area 20-1~20-4 may be one or plural.

Referring to FIGS. 3A and 3B, in an embodiment, the plurality of side holes 21a1, 21a2, 21b1, 21b2 may be disposed on the first side wall 20a and the second side wall 20b according to rows and columns, respectively. Here, the row may correspond to the vertical direction and the column may correspond to the second horizontal direction. For example, as shown in FIG. 3A, the first side hole 21a-1 to the fourth side hole 21a-4 may be disposed in the first side wall 20a so that they are located in the same column.

In this case, the plate 31~34 may have a size covering a side hole located in the same column among the plurality of side holes 21a1, 21a2, 21b1, and 21b2.

Specifically, the first plate 31 may be accommodated in the hollow 251 located in a first column of the first side wall 20a. In this case, the first plate 31 may have a size covering the first side hole 21a-1 to the fourth side hole 21a-4 located in the first column of the first side wall 20a.

For example, the width of the first plate 31 may be larger than the width of each of the first to fourth side holes 21a-1~21a-4. Here, the width may be a length in the Y-axis direction. For example, the height of the first plate 31 may be greater than the height from the first side hole 21a-1 to the fourth side hole 21a-4. Here, the height may be a length in the Z-axis direction. Accordingly, the plate 30 can effectively shield the opposite side hole by gas inflowing through a specific side hole.

In an embodiment, one side hole of the plurality of side holes 21a1, 21a2, 21b1, and 21b2 may be connected to any one hollow of the plurality of hollows 251~254. For example, the first side hole 21a-1 to the fourth side hole 21a-4 located in the first column of the first side wall 20a may be connected to the first hollow 251 located in a first column among the plurality of hollows 251~254. Further, the side hole 21b1 located in a first column of the second side wall 20b may be connected to the first hollow 251 located in the first column. In the same manner, the side hole 21a2 located in a second column of the first side wall 20a may be connected to the second hollow 252 located in the second column, and the side hole 21b2 located in a second column of the second side wall 20b may be connected to the second hollow 252 located in the second column.

Referring to FIG. 3B, in an embodiment, the plurality of connecting parts 20c may connect between the plurality of side walls 20a, 20b to form hollows 251~254.

In an embodiment, the cross section 25r of the connecting part 20c in the vertical direction may have a concave shape. The cross section 25r in the vertical direction may be a cross section of the XY plane perpendicular to the Z-axis direction. For example, as the X-axis location of the connecting part 20c is closer to the first side wall 20a from the center point of the first side wall 20a and the second side wall 20b, the length of the Y-axis of the connecting part 20c may increase. For example, as the X-axis location of the connecting part 20c is closer to the second side wall 20b from the center point of the first side wall 20a and the second side wall 20b, the length of the Y-axis of the connecting part 20c may increase. In other words, both ends of the cross section in the vertical direction of the hollows 251~254 may have a convex shape or a curved shape with curvature. Such a shape of the cross section 25r of the connecting part 20c or the shape of the cross section of the hollows 251~254 has a technical effect of facilitating the movement of the plate 30.

In an embodiment, the thickness of the hollow 251~254 may be larger than the thickness of the plate 30. Here, the thickness may be a length in the X-axis direction. Accordingly, the plate 30 may be accommodated in the hollow 251~254.

Figure 4:
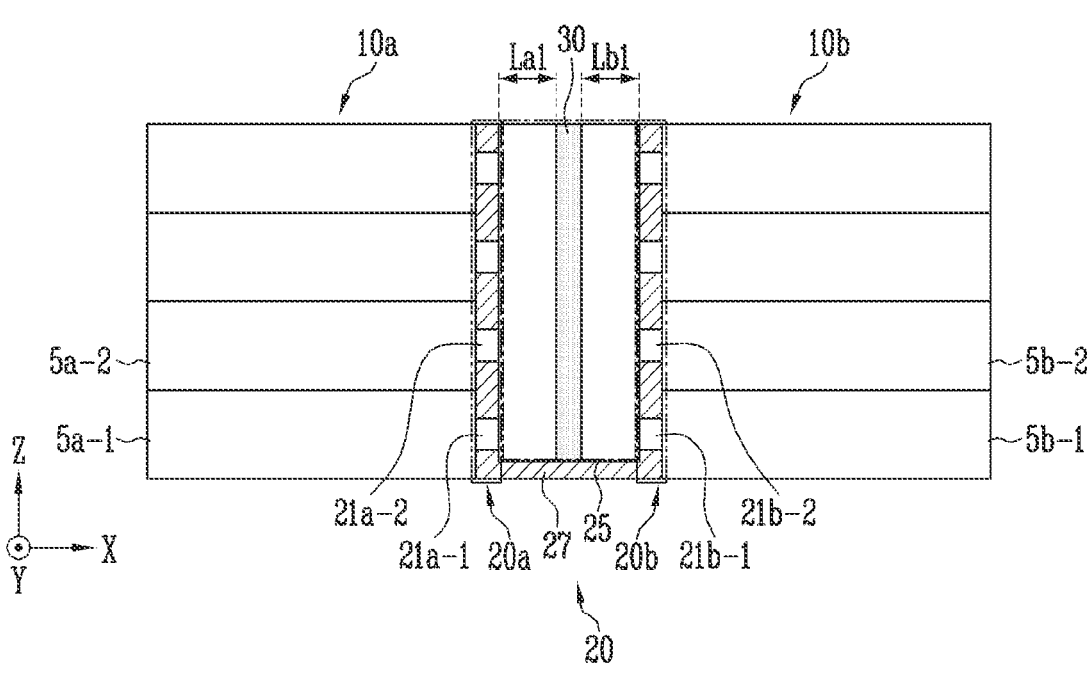
FIG. 4 is a diagram for illustrating a cell stack, a partition wall, and a plate in accordance with an embodiment.

FIG. 4 is a diagram for illustrating a cell stack, a partition wall, and a plate in accordance with an embodiment. FIG. 4 shows a cross section of a battery module in which a cell stack, a partition wall, and a plate are disposed.

Referring to FIG. 4, the partition wall 20 may be disposed between the first cell stack 10a and the second cell stack 10b. The first cell stack 10a and the second cell stack 10b may be spaced apart from each other in the first horizontal direction. The first cell stack 10a may include a plurality of battery cells 5a-1, 5a-2 stacked in the vertical direction. The second cell stack 10b may include a plurality of battery cells 5b-1, 5b-2 stacked in the vertical direction.

The partition wall 20 may include a first side wall 20a and a second side wall 20b. The first side wall 20a may be disposed such that an outer side of the first side wall 20a contacts with the first cell stack 10a. The second side wall 20b may be disposed such that an outer side of the second side wall 20b contacts with the second cell stack 10b.

The first side wall 20a may include a plurality of side holes 21a-1, 21a-2. The side hole 21a-1, 21a-2 of the first side wall 20a may be disposed in a vertical direction in a location corresponding to the battery cell 5a-1, 5a-2 of the first cell stack 10a within the first side wall 20a. The second side wall 20b may include a plurality of side holes 21b-1, 21b-2. The side hole 21b-1, 21b-2 of the second side wall 20b may be disposed in a vertical direction in a location corresponding to the battery cell 5b-1, 5b-2 of the second cell stack 10b within the second side wall 20b.

The partition wall 20 may include a hollow 25 formed between the first side wall 20a and the second side wall 20b. For example, the hollow 25 may be a space between the inner side of the first side wall 20a and the inner side of the second side wall 20b. The hollow 25 may accommodate the plate 30.

In an embodiment, the partition wall 20 may further include a bottom plate 27. The bottom plate 27 may support the plate 30 accommodated in the hollow 25. In an embodiment, the bottom plate 27 may be omitted.

Figure 5:
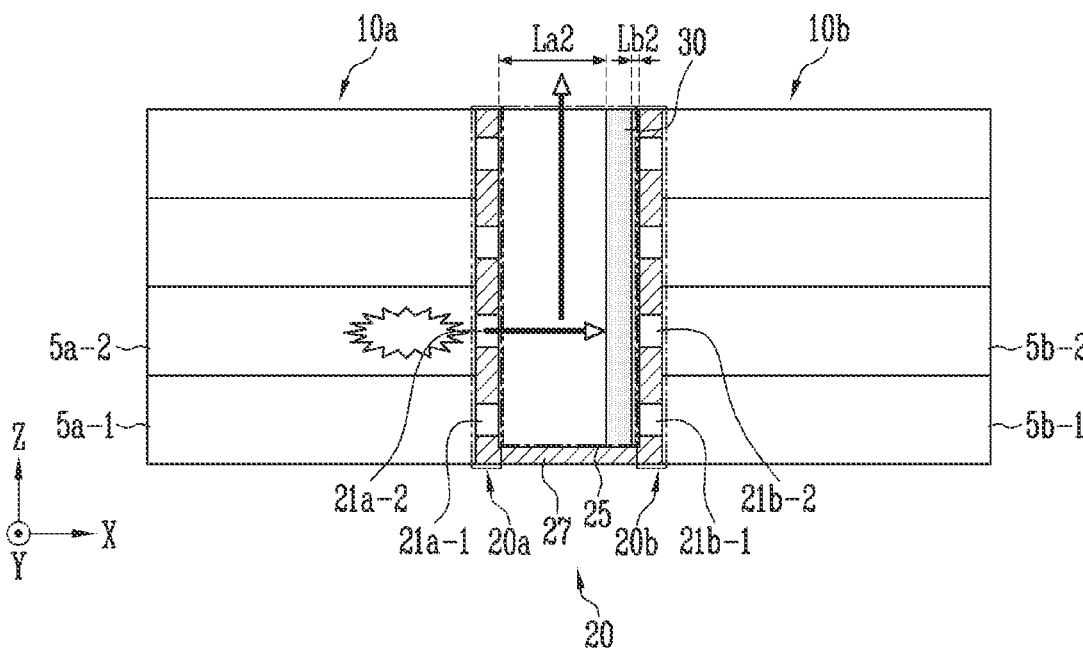
FIG. 5 is a diagram for illustrating a location change of a plate in accordance with an embodiment.

FIG. 5 is a diagram for illustrating a location change of a plate in accordance with an embodiment.

Referring to FIG. 5, gas may be generated in a battery cell of any one cell stack of the first cell stack 10a and the second cell stack 10b. Here, the gas may include at least one of carbon dioxide ($CO_2$), carbon monoxide (CO), acetylene ($C_2H_2$), ethylene ($C_2H_4$), methane ($CH_4$), hydrogen fluoride (HF), hydrogen ($H_2$), and the like. However, this is only an example, and the components of the gas may be variously modified according to the electrolyte included in the battery cell. For example, the description will be made on the assumption that gas is generated in the second battery cell 5a-2 of the first cell stack 10a.

In this case, the gas generated in the second battery cell 5a-2 of the first cell stack 10a may inflow into the hollow 25 through the side hole 21a-2 of the first side wall 20a in contact with the second battery cell 5a-2.

Then, by the pressure of the gas inflowing into the hollow 25 through the side hole 21a-2 of the first side wall 20a, the plate 30 may be moved in the direction in which the gas inflows. In this case, the plate 30 may be moved toward the second side wall 20b, which is opposite to the first side wall 20a.

In an embodiment, the length La2 between the first side wall 20a and the plate 30 may become greater than the length Lb2 between the second side wall 20b and the plate 30 when gas inflows into the side hole 21a-2 of the first side wall 20a.

Here, when gas inflows into the side hole 21a-2 of the first side wall 20a, the length Lb2 between the second side wall 20b and the plate 30 may be reduced to converge to zero. For example, referring to FIGS. 4 and 5, the length Lb2 between the second side wall 20b and the plate 30 after the gas inflows into the side hole 21a-2 of the first side wall 20a may become smaller than the length Lb1 between the second side wall 20b and the plate 30 before the gas inflows into the side hole 21a-2 of the first side wall 20a. Meanwhile, the length La2 between the first side wall 20a and the plate 30 after the gas inflows into the side hole 21a-2 of the first side wall 20a may become greater than the length La1 between the first side wall 20a and the plate 30 before the gas inflows into the side hole 21a-2 of the first side wall 20a.

In other words, when gas inflows through one side hole 21a-2 of the side holes 21a-1 and 21a-2 disposed on the first side wall 20a, the plate 30 may be moved to shield the side holes 21b-1 and 21b-2 disposed on the second side wall 20b. In this case, the side holes 21b-1, 21b-2 of the second side wall 20b are shielded by the plate 30, so that the connection between the side holes 21b-1, 21b-2 of the second side wall 20b and the hollow 25 may be blocked. Accordingly, propagation of the high temperature gas and heat generated in the second battery cell 5a-2 of the first cell stack 10a to the battery cells 5b-1, 5b-2 included in the second cell stack 10b may be minimized.

In addition, the gas inflowing through the side hole 21a-2 may be discharged to the external space through the upper part of the hollow 25. Here, the upper part of the hollow 25 may be connected to an external space.

Figure 6A:
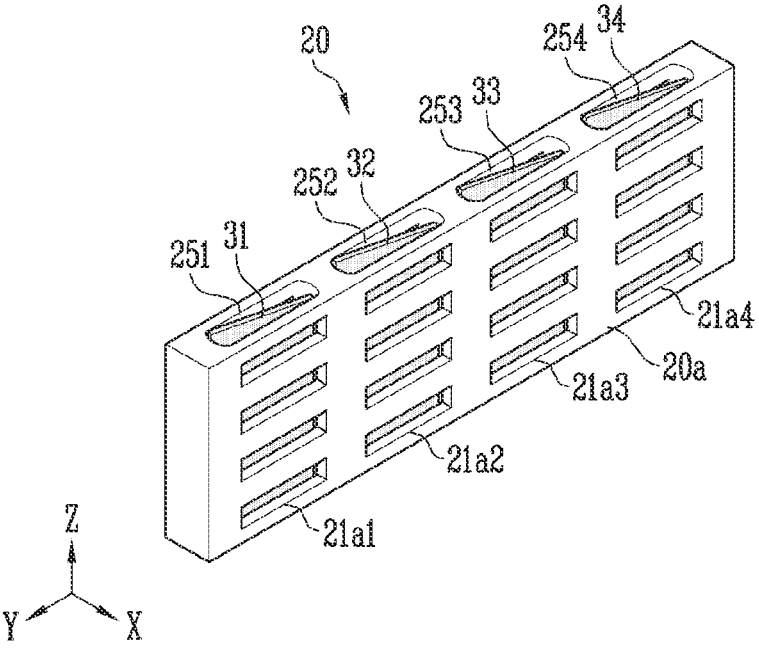
FIGS. 6A and 6B are diagrams for illustrating an arrangement of plates in accordance with an embodiment.
Figure 6B:
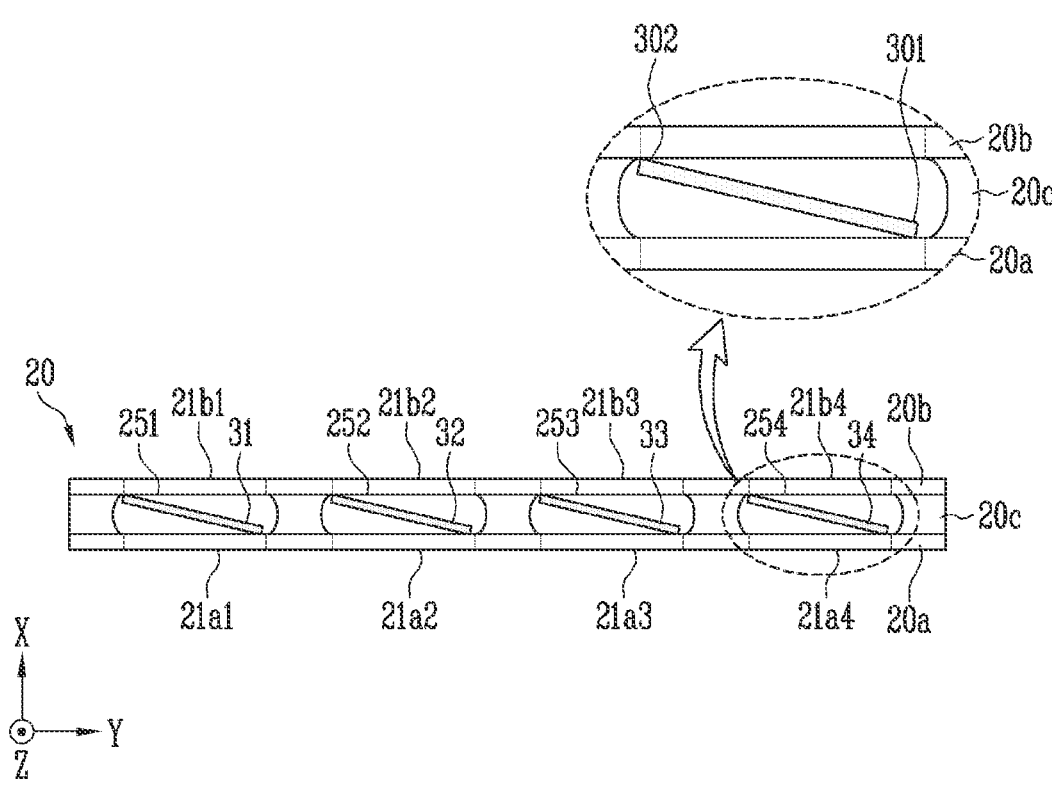

FIGS. 6A and 6B are diagrams for illustrating an arrangement of plates in accordance with an embodiment. FIG. 6A is a perspective view of a partition wall in which a plate is accommodated, and FIG. 6B is a plan view of a partition wall in which a plate is accommodated.

Referring to FIGS. 6A and 6B, the partition wall 20 may include a plurality of hollows 251~254 and a plurality of side holes 21a1~21a4, 21b1~21b4. Each hollow 251~254 disposed between the first side wall 20a and the second side wall 20b may be connected to the side hole 21a1~21a4 of the first side wall 20a and the side hole 21b1~21b4 of the second side wall 20b. A plurality of plates 31~34 may be accommodated in a plurality of hollows 251~254, respectively.

In an embodiment, the first side end 301 of each plate 31~34 may be coupled to the inner side of the first side wall 20a. The second side end 302 of each plate 31~34 may be coupled to the inner side of the second side wall 20b. In other words, the plate 30 may be coupled to each of the first side wall 20a and the second side wall 20b. For example, the plate 30 may be manufactured in a state coupled to each of the first side wall 20a and the second side wall 20b. In other words, the plate 30 may be manufactured as an integral part together with the first side wall 20a and the second side wall 20b. In this case, the plate 30 may be of the same material as the first side wall 20a and the second side wall 20b. For another example, after the plate 30 and the first side wall 20a and the second side wall 20b are manufactured as individual parts, the plate 30 may be coupled to each of the first side wall 20a and the second side wall 20b using various methods such as adhesive or welding.

In an embodiment, when the pressure of the gas inflowing through the side hole 21a1~21a4, 21b1~21b4 in a state where the plate 30 is coupled to the first side wall 20a and the second side wall 20b, respectively, is greater than the reference value, the coupling surface may be broken so that the plate 30 may be separated from at least one of the first side wall 20a and the second side wall 20b. In this case, the plate 30 may be able to move by the inflowing gas.

In an embodiment, the partition wall 20 and the plate 30 may be manufactured as a single structure, or the partition wall 20 and the plate 30 may be manufactured as separate structures and assembled. For example, the partition wall 20 and the plate 30 may be manufactured according to various manufacturing methods such as extrusion, casting, and cutting processing.

Figure 7A:
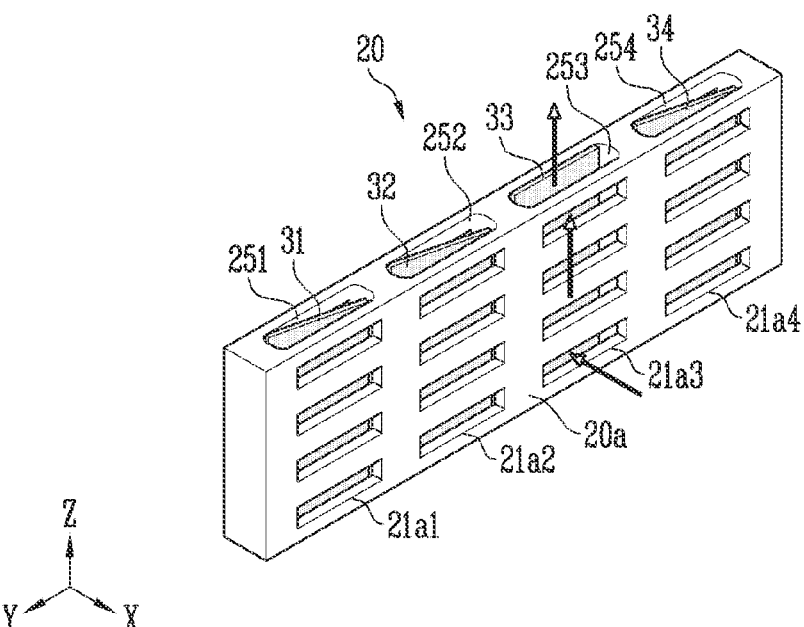
FIGS. 7A and 7B are diagrams for illustrating a location change of a plate in accordance with an embodiment.
Figure 7B:
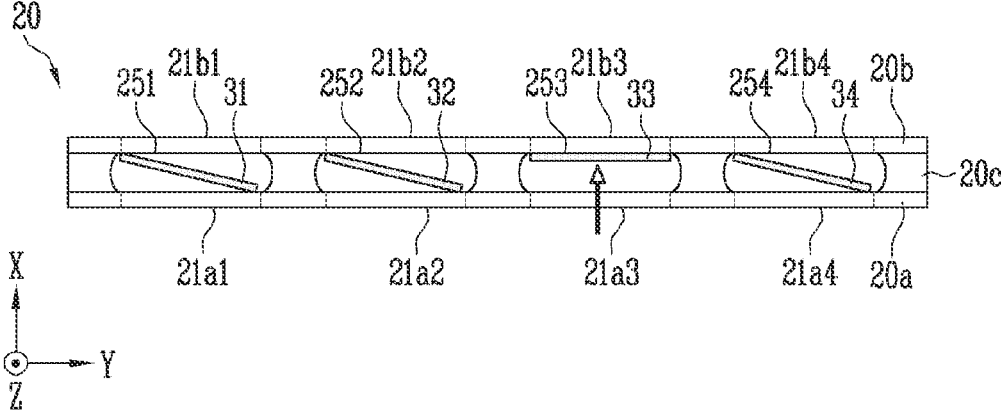

FIGS. 7A and 7B are diagrams for illustrating a location change of a plate in accordance with an embodiment.

Referring to FIGS. 7A and 7B, gas generated in the battery cell may inflow through the side hole. Hereinafter, it is assumed that gas is generated from the battery cell in contact with the first side wall 20a and inflows into the third side hole 21a3 of the first side wall 20a of the plurality of side holes 21a1~21a4, 21b1~21b4.

Here, a state before the gas inflows into the third side hole 21a3 may be the state shown in FIGS. 6A and 6B. In other words, the first side end 301 of each plate 31~34 may be attached to the inner side of the first side wall 20a. The second side end 302 of each plate 31~34 may be attached to the inner side of the second side wall 20b.

In an embodiment, when gas inflows into the third hollow 253 through the third side hole 21a3 of the first side wall 20a, the first side end 301 of the third plate 33 may be broken by the gas and separated from the inner side of the first side wall 20a. The third hollow 253 may be a hollow connected to the third side hole 21a3 among the plurality of hollows 251~254. The third plate 33 may be a plate accommodated in the third hollow 253 among the plurality of plates 31~34.

For example, when the pressure of the gas inflowing through the third side hole 21a3 is greater than or equal to a reference value, the first side end 301 of the third plate 33 may be separated from the first side wall 20a. Meanwhile, when the pressure of the gas inflowing through the third side hole 21a3 is less than a reference value, the first side end 301 of the third plate 33 may remain coupled to the first side wall 20a without being separated from the first side wall 20a.

Further, after the first side end 301 of the third plate 33 is separated by the gas, the first side end 301 of the third plate 33 may be moved toward the second side wall 20b by the gas. Further, the third side hole 21b3 of the second side wall 20b may be shielded by the moved third plate 33. In other words, the third plate 33 may be moved in the direction in which the gas inflows. In this case, the third side hole 21b3 of the second side wall 20b may be shielded by the third plate 33 to prevent the heat of the gas from being transferred to the battery cell in contact with the second side wall 20b.

In this case, the gas inflowing into the third hollow 253 through the third side hole 21a3 may be discharged to the external space through the upper part of the third hollow 253.

In an embodiment, when gas does not inflow into the remaining side holes 21a1, 21a2, 21a4 other than the third side hole 21a3, or the pressure of the inflowing gas is less than a reference value, the plates 31, 32, 34 accommodated in the hollows 251, 252, 254 connected to the remaining side holes 21a1, 21a2, 21a4 may remain fixed to the side walls 20a 20b.

Figure 8A:
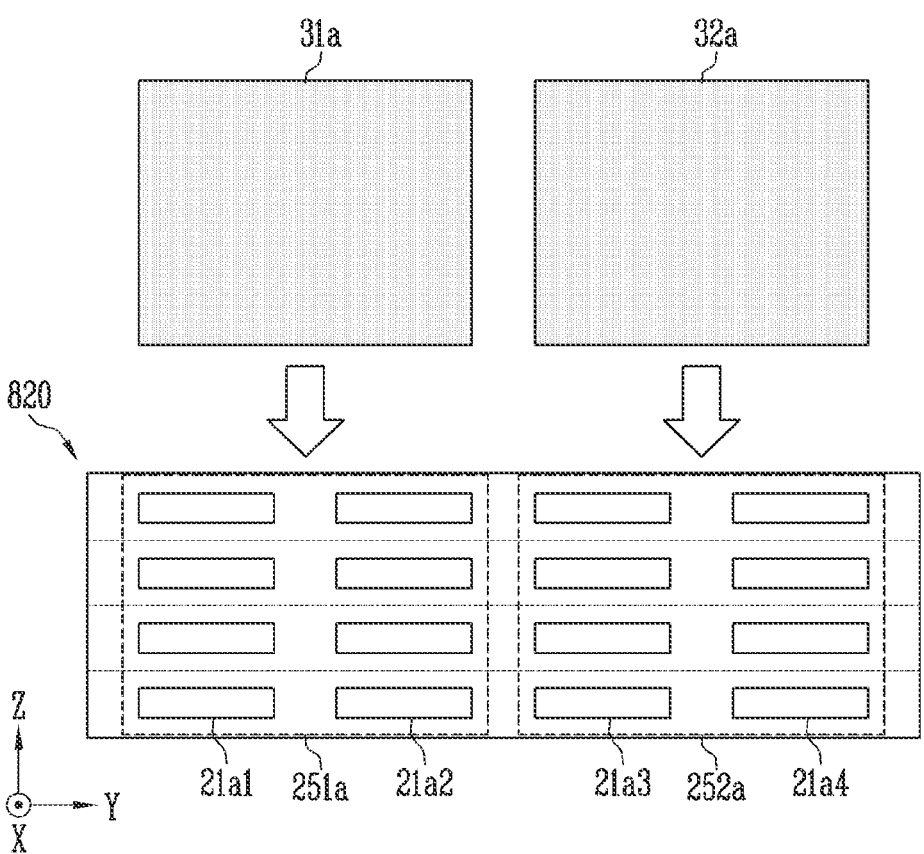
FIGS. 8A and 8B are diagrams for illustrating hollows and plates in accordance with an embodiment.
Figure 8B:
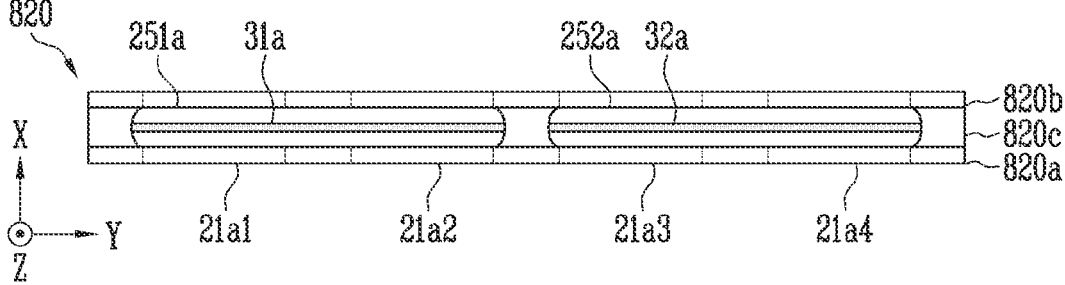

FIGS. 8A and 8B are diagrams for illustrating hollows and plates in accordance with an embodiment. FIG. 8A is a side view of a partition wall, and FIG. 8B is a plan view of a partition wall.

Referring to FIGS. 8A and 8B, the number of hollows 251a, 252a included in the partition wall 820 may be variously modified. The number and size of plates 31a, 32a may be variously modified and implemented. In this case, the number of hollows 251a, 252a may be the same as the number of plates 31a, 32a.

In an embodiment, the plate 31a, 32a may have a size that covers side holes corresponding to two columns. For example, the first plate 31a may have a size including the side holes 21a1 of the first column and the side holes 21a2 of the second column. The second plate 32a may have a size including the side holes 21a3 of the third column and the side holes 21a4 of the fourth column.

Each hollow 251a, 252a may have a size that may accommodate one plate 31a, 32a. In this case, the first hollow 251a may be connected to the side holes 21a1 of the first column and the side holes 21a2 of the second column. The second hollow 252a may be connected to the side holes 21a3 of the third column and the side holes 21a4 of the fourth column.

Figure 9A:
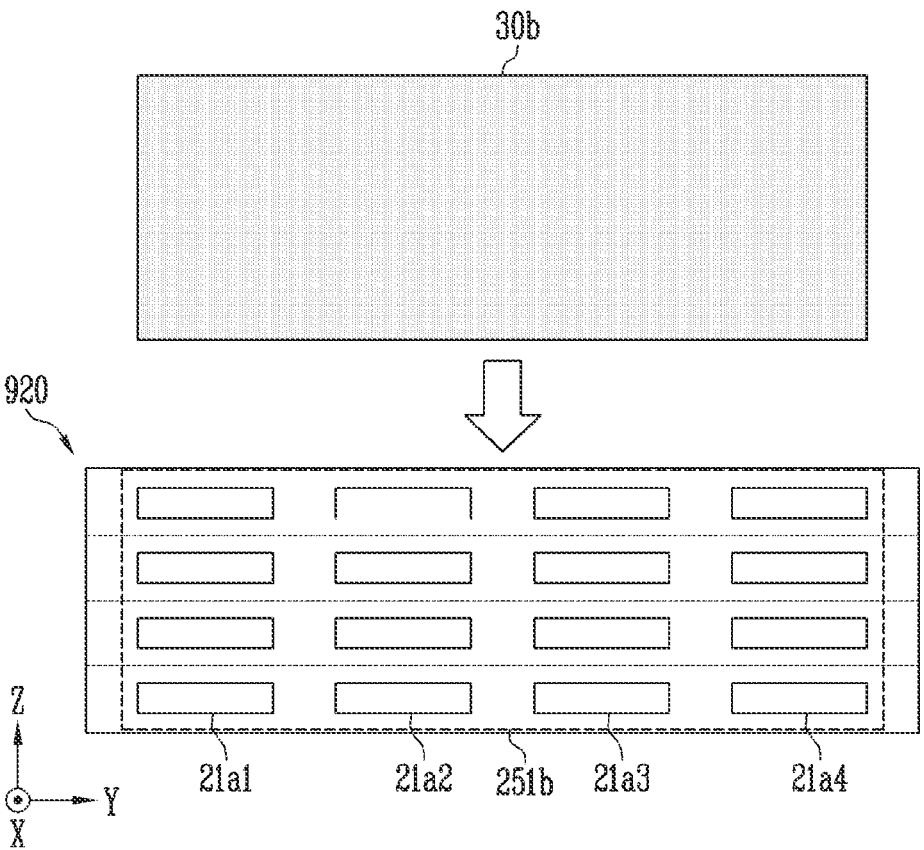
FIGS. 9A and 9B are diagrams for illustrating hollows and plates in accordance with an embodiment.
Figure 9B:
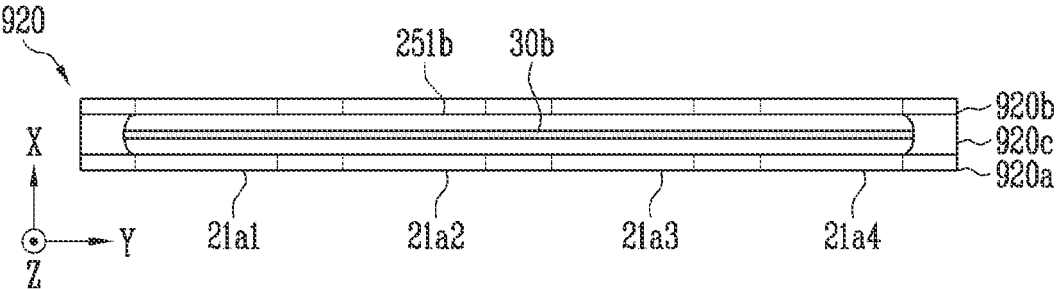

FIGS. 9A and 9B are diagrams for illustrating hollows and plates in accordance with an embodiment. FIG. 9A is a side view of a partition wall, and FIG. 9B is a plan view of a partition wall.

Referring to FIGS. 9A and 9B, the number of plates 30*b* of the present disclosure may be one. In this case, the number of hollows 251*b* may be one.

In an embodiment, plate 30*b* may have a size that covers side holes corresponding to all columns. For example, the plate 30*b* may have a size including the side holes 21*a*1 of the first column to the side holes 21*a*4 of the fourth column.

The hollow 251*b* may have a size that may accommodate one plate 30*b*. In this case, the hollow 251*b* may be connected to the side holes 21*a*1 of the first column to the side holes 21*a*4 of the fourth column.

Figure 10:
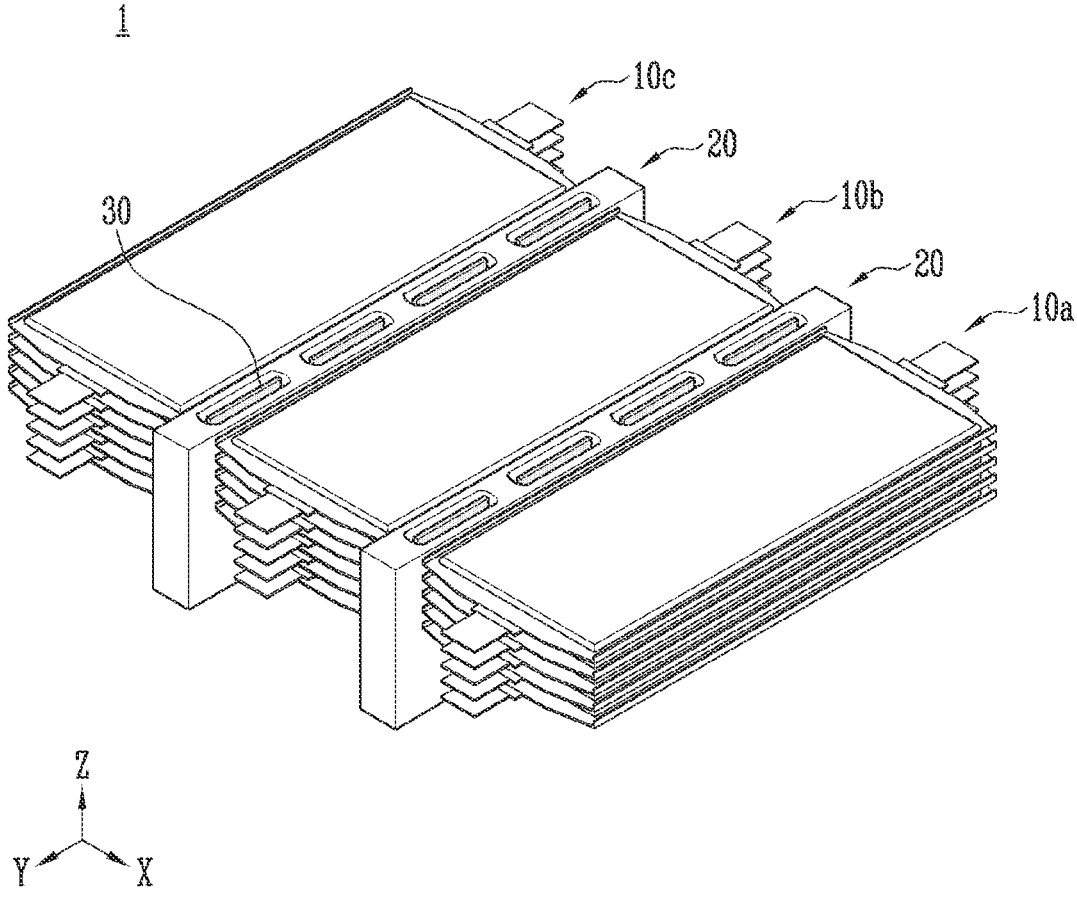
FIG. 10 is a diagram for illustrating a battery module in accordance with an embodiment.

FIG. 10 is a diagram for illustrating a battery module in accordance with an embodiment.

Referring to FIG. 10, the battery module 1 of the present disclosure may include three or more cell stacks 10*a*, 10*b*, 10*c*, a partition wall 20 disposed between the cell stacks 10*a*, 10*b*, 10*c*, and a plate 30 accommodated in the partition wall 20.

For example, the first cell stack 10*a* to the third cell stack 10*c* may be spaced apart in the first horizontal direction. In this case, the partition wall 20 may be disposed between the first cell stack 10*a* and the second cell stack 10*b*, and between the second cell stack 10*b* and the third cell stack 10*c*. The partition wall 20 may include a hollow in which the plate 30 is accommodated and a side hole formed on a side surface. Since it overlaps with the above description, a detailed description of the partition wall 20 and the plate 30 will be omitted.

Meanwhile, the embodiment shown in FIG. 10 is only one embodiment, and the number of cell stacks 10*a*, 10*b*, 10*c* and the partition walls 20 and the arrangement method accordingly may be variously modified and implemented.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A battery module comprising:
a plurality of cell stacks spaced apart from each other in a horizontal direction;
a plurality of side walls disposed between the plurality of cell stacks and spaced apart from each other in the horizontal direction; and
a plate accommodated in a hollow between the plurality of side walls,
wherein each of the plurality of side walls comprises a side hole connected to the hollow, and
wherein the plate is moved to shield the side hole of a second side wall of the plurality of side walls by gas inflowing into the hollow through the side hole of a first side wall of the plurality of side walls.

2. The battery module of claim 1, wherein an upper part of the hollow is connected to an external space, and
the inflowing gas is discharged to the external space through the upper part of the hollow.

3. The battery module of claim 1, wherein a length between the first side wall and the plate becomes greater than a length between the second side wall and the plate when the gas inflows into the side hole of the first side wall.

4. The battery module of claim 1, wherein each of the plurality of cell stacks comprises a plurality of battery cells stacked in a vertical direction.

5. The battery module of claim 4, wherein each of the plurality of side walls comprises a plurality of sub-areas disposed in the vertical direction, and
each of the plurality of sub-areas contacts with one of the plurality of battery cells.

6. The battery module of claim 5, wherein the side hole is disposed in each of the plurality of sub-areas.

7. The battery module of claim 1, further comprising:
a plurality of connecting parts configured to connect between the plurality of side walls to form the hollow.

8. The battery module of claim 7, wherein a cross section in a vertical direction of each of the plurality of connecting parts is concave.

9. The battery module of claim 1, wherein a first side end of the plate is coupled to an inside of a first side wall of the plurality of side walls, and a second side end of the plate is coupled to an inside of a second side wall of the plurality of side walls.

10. The battery module of claim 9, wherein the first side end of the plate is separated from the inside of the first side wall by gas inflowing into the hollow through a side hole of the first side wall and then moved to the inside of the second side wall, and
a side hole of the second side wall is shielded by the plate.

11. The battery module of claim 1, wherein the plate comprises an insulating material.

12. A battery module comprising:
a first cell stack and a second cell stack spaced apart from each other in a first horizontal direction;
a partition wall comprising a first side wall and a second side wall disposed between the first cell stack and the second cell stack, and a plurality of hollows disposed between the first side wall and the second side wall; and
a plurality of plates, each of the plurality of plates being accommodated in each of the plurality of hollows,
wherein each of the first side wall and the second side wall comprises a plurality of side holes, and wherein the plurality of plates are moved to shield the side holes of the second side wall by gas inflowing into the plurality of hollows through the side holes of the first side wall.

13. The battery module of claim 12, wherein each of the plurality of side holes is connected to any one hollow of the plurality of hollows.

14. The battery module of claim 13, wherein the plurality of hollows comprise a first hollow connected to a first side hole of the first side wall and a second side hole of the second side wall among the plurality of side holes, and a second hollow connected to a third side hole of the first side wall and a fourth side hole of the second side wall among the plurality of side holes.

15. The battery module of claim 14, wherein the plurality of plates comprise a first plate accommodated in the first hollow and a second plate accommodated in the second hollow.

16. The battery module of claim 15, wherein the first plate is moved to shield the second side hole when gas inflows into the first hollow through the first side hole.

17. The battery module of claim 16, wherein the gas is discharged to an external space through the first hollow.

18. The battery module of claim 12, wherein the partition wall further comprises a plurality of connecting parts spaced apart from each other in a second horizontal direction between the first side wall and the second side wall to form the plurality of hollows.

19. The battery module of claim 12, wherein each of the first cell stack and the second cell stack comprises a plurality of battery cells stacked in a vertical direction, the plurality of side holes are disposed on each of the first side wall and the second side wall according to a row corresponding to the vertical direction and a column corresponding to the second horizontal direction, and each of the plurality of plates has a size covering side holes located in the same column among the plurality of side holes.

* * * * *